June 30, 1931.  C. M. STANLEY ET AL  1,812,725
METHOD OF ATTACHING FILTER CLOTH
Filed Aug. 27, 1927  2 Sheets-Sheet 1
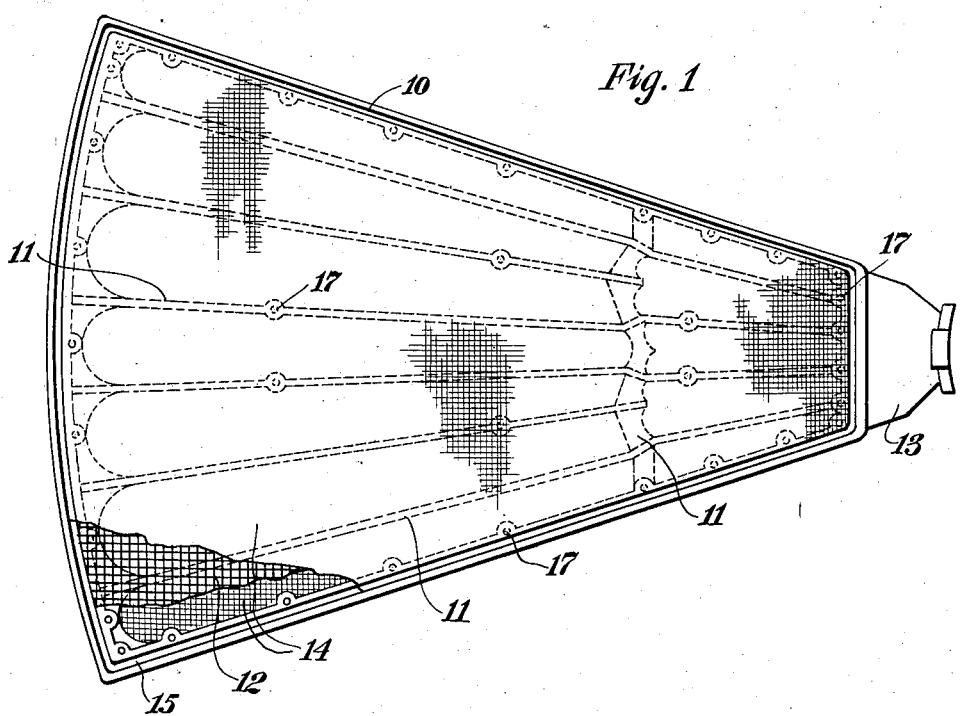
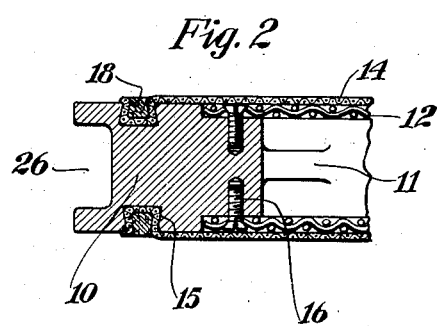
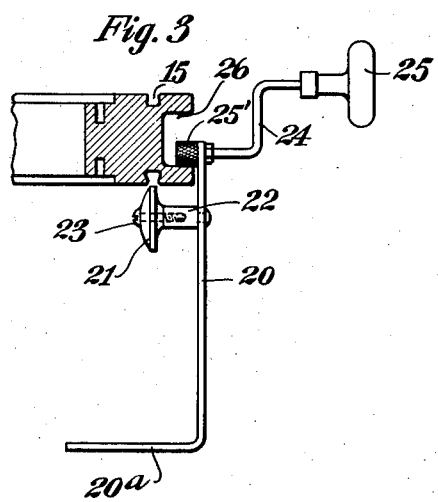
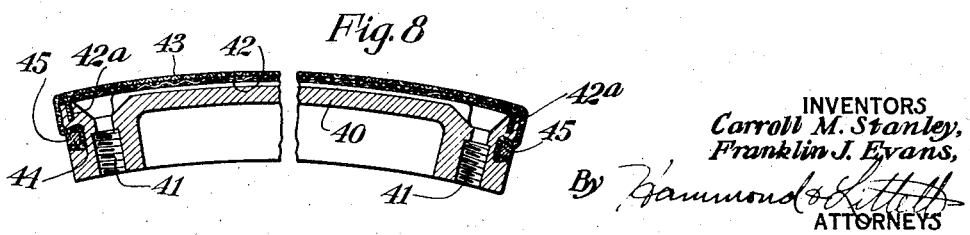
INVENTORS
Carroll M. Stanley,
Franklin J. Evans,
By Hammond & Littell
ATTORNEYS

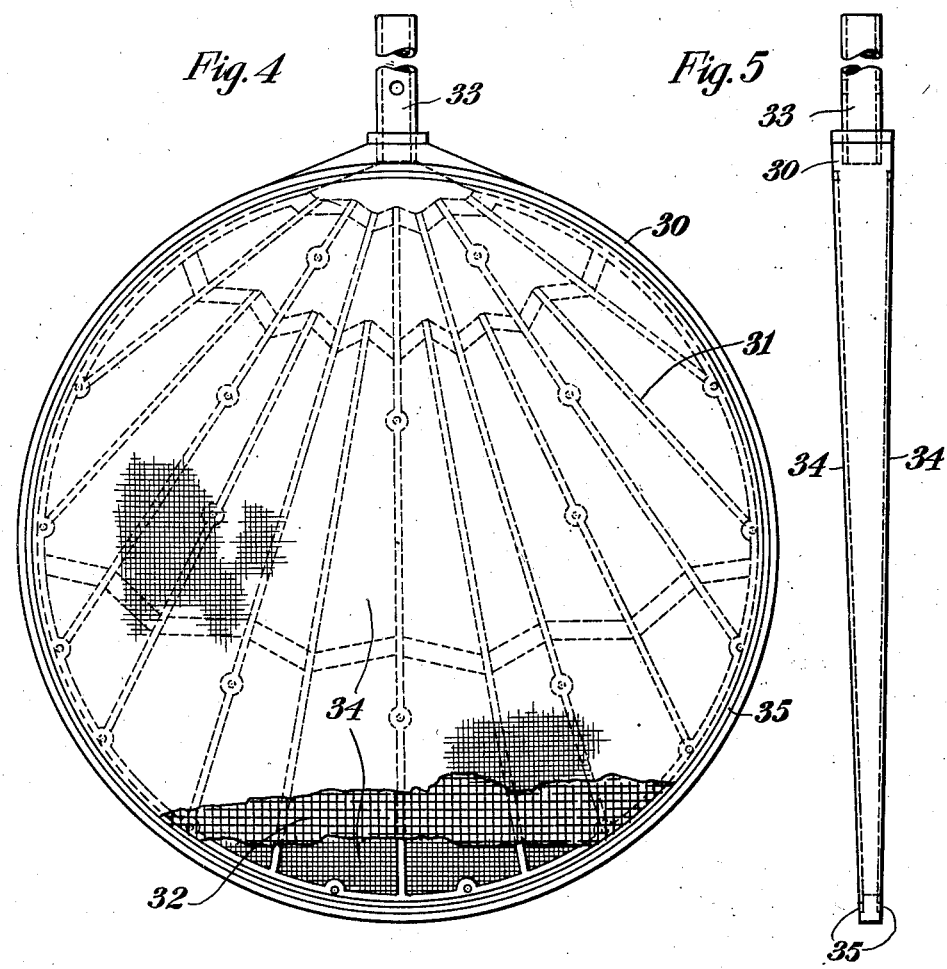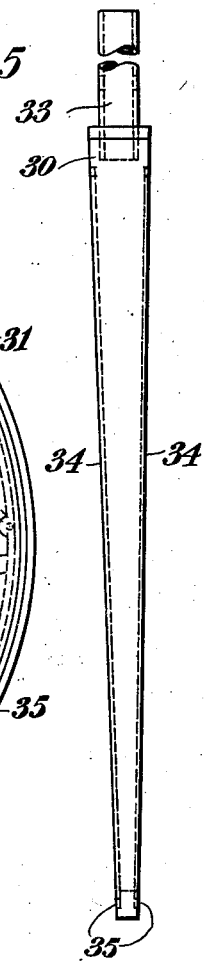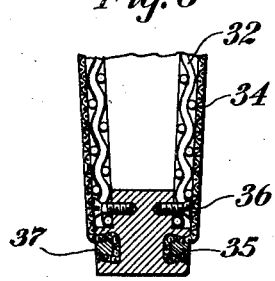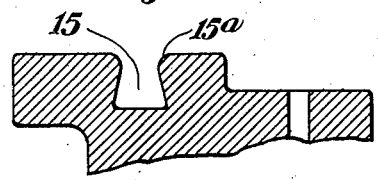

Patented June 30, 1931

1,812,725

UNITED STATES PATENT OFFICE

CARROLL M. STANLEY AND FRANKLIN J. EVANS, OF HAZLETON, PENNSYLVANIA, ASSIGNORS, BY MESNE ASSIGNMENTS, TO OLIVER UNITED FILTERS INC., OF SAN FRANCISCO, CALIFORNIA, A CORPORATION OF NEVADA

METHOD OF ATTACHING FILTER CLOTH

Application filed August 27, 1927. Serial No. 215,810.

This invention relates to improvements in method and means for attaching filter cloth to a supporting filter frame.

An essential requirement for filter mediums which are usually of metallic or fabric cloth is that they shall be stretched tight and be attached or removed and reattached without the use of considerable equipment. When repairs are of necessity made in the field, the delay of returning the filter sections to the factory to be renewed would be highly undesirable, very costly and would prevent the successful operation of the filter. Heretofore, the method of attaching the filter cloth has been by means of a permanent seal which could not be replaced in the field or by means of numerous rivets which were difficult to remove and it was practically impossible to stretch the filter cloth tight during the application. Such constructions were also expensive and time consuming in the first as well as subsequent applications.

It is therefore an object of this invention to provide a method and means for attaching the filter cloth to a filter frame which is more effective in application, may be removed and replaced quickly and with equal effectiveness and by which repairs and original installations may be made at the least cost and time.

It is a further object of this invention to provide a method of applying a filter cloth to a filter frame of any of the usual types in which the frame is suitably grooved to receive the filter cloth and retained in place by a retaining element which stretches and forcibly maintains the cloth in taut position.

It is a still further object of this invention to provide a method for attaching a metallic filter cloth to a filter frame by means of forming a peripheral groove in the surface of said frame and forcing the cloth into contact with said sides of said groove and locking it in position by a ductile retaining strip.

Further objects and advantages of this invention will appear from the following detailed description of preferred forms of embodiment thereof, which together with the attached drawings, constitutes a full, complete disclosure which will enable others skilled in the art to produce the same as will be more fully set forth. In reference to the drawings:

Figure 1 is a side elevation of a sector of a rotary disc filter.

Figure 2 is an enlarged detail through the periphery of the sector showing the arrangement for fastening the filter mediums thereto.

Figure 3 is a detail view similar to Figure 2 showing the application of the tool to the covered sector.

Figure 4 is a side elevation of a modified form of filter disc or leaf for a stationary filter.

Figure 5 is an end view of the filter disc shown in Figure 4.

Figure 6 is an enlarged detail of the completed disc, and,

Figure 7 is an enlarged detail of the groove in the sector or disc surface.

Figure 8 is a sectional view illustrating the application of the invention to a segment of a rotary drum filter.

The filter sector 10 as shown in Figure 1 is typical of the filter unit of the discs shown in Patent #1,259,139, patented Mar. 12, 1918, to O. J. Salisbury and in general known as the continuous rotating leaf filter. This disc is provided with a sector shaped, substantially hollow frame and in which it may be desirable to place reinforcing ribs 11. These internal ribs aid in keeping the frame-work rigid as well as to support the filter cloth backing screen 12 and on which the filter cloth 14 is superposed for the purpose of separating filtrate from pulp in the filtering operation. The frame is attached to a central hollow rotary filtrate shaft (not shown) by the arc shaped end 13 which is internally connected to the center of the sector. It will be understood that as the disc rotates, through a solution of material to be filtered, the suction on the inside of the central hollow shaft will draw the filtrate through the filter cloth 14 and the solids will form on the surfaces of the disc inasmuch as the fine mesh will permit nothing to pass through but the filtrate which is drawn therethrough.

The filter frame 10 is shown in enlarged detail in Figure 2 after having been suitably machined to receive the filter cloth 14 and the backing screen 12 in the manner provided for by our invention. The flange or periphery on each side of the disc is grooved at 15 by a milling cutter or any similar form of cutting or grooving device and this groove extends entirely around the filtering portion of the disc surrounding the central open drainage portion.

In the assembly of the filter cloth and supporting screen to the disc, the reinforcing and heavy coarse backing screen or plate 12 is first attached by escutcheon pins or machine or drive screws 16 at various enlarged places 17 around the edge of the disc 10 and on the reinforcing ribs 11. The fine filtering cloth is next attached by laying a portion of the cloth or metallic screen roughly cut to shape over the disc and driving it into the grooves 15 by any suitable device such as a thin fiber wedge similar to a chisel and a hammer. After being forced into the groove such as shown in Figure 2, a retaining strip 18 is forced into the groove to bind the edges of the cloth. The retaining means 18 will preferably be in a ductile wire form although an elastic material or thin brass tubing may be used and after being started in the groove with some blunt edged fiber tool it may be easily forced into the remainder of the groove with the special roller tool shown in Figure 3. This tool comprises an angular arm 20 with a handle 20a and a roller 21 intermediate of its length spaced from the shank of the handle by a spacing member 22 and suitably attached thereto by means of a screw bolt 23. The end of the shank is provided with an aperture through which a crank 24 extends which is in turn provided on the roller side with a knurled wheel 25' cooperating with the retaining bolt slot 26 around the periphery of the filter sector. The crank 24 is provided with a rotatable handle 25 which will permit rotation of the crank 24 to move the tool the length of the disc sector.

In operation, the lead or other retaining material 18 such as tubular pipe or rope may be started in some portion of the length of the groove 15, after the filter medium 14 has been forced therein, although it is possible to roll the retaining strip of cloth into the groove at once. The tool 20 will then be applied and as the operator grasps the handle 20a pushing it from him, he will bias the wheel 21 on the retaining strip or lead 18 to force the lead into the groove on top of the filter cloth. By continuing the push on the handle 20a and by rotating the crank 24, the knurled wheel will engage with the inner surface of the depression 26 and will cause the tool to move the length of the sector. It will thus be obvious that the greater the pull or force exerted on the handle 20a the greater the force exercised to depress the retaining material in the groove on top of the cloth. Similarly it will be seen that the more the crank 24 is rotated the greater the travel of the tool. In order to make a secure job, the tool is first drawn along the retaining material to force it into the groove and in a second operation the pressure is considerably increased and the metal is swaged into the groove. It will be understood that it is not essential to use a soft metal wire such as lead, but that a retaining strip such as metal tubing, a cord or a rope made from suitable materials or other forms of metallic wire might be used. The lead has been found to be most effective in ease of application and in ease of removal.

The forcing of this retaining means into the groove, draws the filter cloth very tight forming a highly efficient filter surface and effectively holds it in this position, the groove 15 being slightly dove-tailed for this purpose. In order to prevent damage to the filter cloth by forcing metallic cloth into the groove and then forcing the retaining strip in on top, large plates substantially the size of the segment sector are applied to the surface and weights are added to hold the cloth in as near a smooth manner as possible. After the retaining strip has been forced in the entire length of the groove, the surplus cloth projecting beyond the edge of the retaining means is removed by a suitable cutting tool and the filter disc is then turned over so that the same operations may be completed on the reverse side. It will be noted that in order to remove the filter cloth, it is merely necessary to remove the retaining means or the lead strip 18 and remove the filter cloth from the sector. It is then possible to resurface the disc by replacing the cloth and again securing it to the disc frame by the heretofore mentioned method. This work may be done in the field and in no way destroys or injures the surface or any part of the sector frame and is therefore particularly adapted to those installations which require frequent renewal of the filter cloth.

The term "cloth" or term "filter cloth" means, and is intended to embrace, all the usual forms of filtering material whether they be of metal, fibre, or other forms and whether they be woven or knitted or plate. The showing is of a metallic filter cloth made of copper screening although it is intended purely for the purpose of illustration and is suggestive and not restrictive.

In a modified application of the invention illustrated in Figures 4 to 7, a substantial circular leaf 30 is shown comprising a frame having reinforcing ribs 31 and adapted to receive a substantially heavy and coarse backing screen 32 and a relatively fine filter cloth 34 attached to the sides thereof. An outlet 33 is provided for attachment to a suitable header (not shown) for removing the filtrate from the central part of the disc 30 and to cause the filter cake to form on the screen or filter medium 34. The backing screen 32 is attached to the disc frame by means of screws 36 which may desirably be escutcheon pins or threaded-drive screws similar to those shown at 16.

A groove 35, similar to the aforementioned groove 15 is formed circumferentially near the outer edge of the disc and is similarly adapted to have the filter cloth 34 forced therein with some variety of blunt edged tool and to have a retaining strip 37 forced thereon substantially filling the groove 35 and drawing the filter cloth 34 tight on the surface of the disc. The operation of forcing this retaining means 37 into position is similar to that shown and described in connection with Figure 3 and a similar tool may be used.

In the enlarged detail of groove 15 as shown in Figure 7, the dove-tail of the groove is clearly illustrated and is formed by cutting a substantially square groove with a milling cutter and then attaching a dove-tail tool to any form of hammer such as a pneumatic hammer which will force the dove-tail tool through the groove, thereby enlarging it on the inner surface. When the retaining material is placed in such a groove the narrow opening prevents the retaining means from coming out and makes a more secure application. To prevent the edges of the groove from cutting the filter cloth each of the upper edges are rounded as indicated at 15a.

In the embodiment of the invention illustrated in Figure 8 a segment 40 of a drum filter is shown. The filtrate outlet passages 41 communicate with a central rotating shaft and the filtering surface is provided with a backing screen 42 secured by drive-screws 42a and a filter cloth 43 secured in the grooves 44 by the lead wire or the like 45.

From the foregoing disclosure, it will be seen that we have produced a highly desirable and very simple method for attaching a filter cloth to a filter frame. Although we have shown only common forms of filter frames it is obvious that this method of forming a groove, forcing a cloth into the groove, and then securing the cloth by means of a retaining means which is readily applied, is adapted for any of the usual forms of frames. It is also obvious that many modifications in the form of tools used may be devised and although the tool shown in Figure 3 is a highly successful one in operation, it is to be understood that it is merely a means for carrying out the heretofore disclosed method. It is to be also noted that the action of the retaining means in being wedged into the groove on top of the filter cloth not only positively secures the cloth, but also serves to stretch the cloth making a much more neat and more workman-like article as well as to aid the filtering efficiency by the tight surface.

While we have shown preferred forms of embodiment of this invention, we do not desire to be limited to the details thereof except as is necessary in a broad interpretation thereof and being aware that various modifications may occur to those skilled in the art, we desire a broad interpretation of the invention as disclosed herein and as particularly defined in the claim hereinafter set forth.

We claim:

The method of tensioning and positively securing filter cloth over a backing screen to a segment of a filter leaf which comprises forming an inwardly flanged groove surrounding the opening in said segment forcing and stretching the filter cloth into said groove, the amount of cloth forced into said groove being substantially more than three times the width of the opening in said slot, subsequently forcing a soft metallic element into said groove and finally deforming the soft metallic element in said groove to an effective width substantially greater than the effective width of the groove.

In testimony whereof we have affixed our signatures to this specification.

CARROLL M. STANLEY.
FRANKLIN J. EVANS.